US010585989B1

United States Patent
Ahmed et al.

(10) Patent No.: US 10,585,989 B1
(45) Date of Patent: Mar. 10, 2020

(54) MACHINE-LEARNING BASED DETECTION AND CLASSIFICATION OF PERSONALLY IDENTIFIABLE INFORMATION

(71) Applicant: International Business Machines Corporation, Armonk, NY (US)

(72) Inventors: Mohamed N. Ahmed, Loudoun County, VA (US); Andeep S. Toor, Chantilly, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/125,389

(22) Filed: Sep. 7, 2018

(51) Int. Cl.
  *G06F 17/27* (2006.01)
  *G06N 3/04* (2006.01)
  *G06N 3/08* (2006.01)

(52) U.S. Cl.
  CPC ........ *G06F 17/2785* (2013.01); *G06F 17/274* (2013.01); *G06F 17/2735* (2013.01); *G06N 3/0445* (2013.01); *G06N 3/0454* (2013.01); *G06N 3/08* (2013.01)

(58) Field of Classification Search
  CPC ............... G06F 17/2735; G06F 17/274; G06F 17/2785; G06N 3/08; G06N 3/0445; G06N 3/0454
  See application file for complete search history.

(56) References Cited

U.S. PATENT DOCUMENTS

| | | | |
|---|---|---|---|
| 8,234,263 B2 | 7/2012 | Pradhan et al. | |
| 9,396,179 B2 | 7/2016 | Stavrianou et al. | |
| 9,805,371 B1* | 10/2017 | Sapoznik | G06F 16/9024 |
| 10,332,508 B1* | 6/2019 | Hoffmeister | G10L 15/16 |
| 2008/0263333 A1 | 10/2008 | Wang et al. | |
| 2014/0068706 A1* | 3/2014 | Aissi | G06F 21/6254 726/1 |
| 2014/0074845 A1 | 3/2014 | Dimassimo et al. | |
| 2014/0164408 A1 | 6/2014 | Dubbels | |
| 2017/0316285 A1* | 11/2017 | Ahmed | G06K 9/66 |
| 2018/0075254 A1* | 3/2018 | Reid | G06F 7/00 |
| 2019/0018983 A1* | 1/2019 | Anderson | G06F 21/64 |
| 2019/0080063 A1* | 3/2019 | Rice | G06F 21/316 |
| 2019/0171846 A1* | 6/2019 | Conikee | G06F 21/6245 |

* cited by examiner

*Primary Examiner* — Walter Yehl
(74) *Attorney, Agent, or Firm* — Garg Law Firm, PLLC; Rakesh Garg; James Nock (57) ABSTRACT

Detection and classification of personally identifiable information includes identifying a document with a known author. A first set of features of the document is extracted using natural language processing, and a second set of features of the document is extracted based upon one or more past documents for the known author using a recurrent neural network. The first set of features and the second set of features are classified using a classifier to produce classified extracted features. Personally identifiable information is labeled in the document based upon the classified extracted features.

19 Claims, 7 Drawing Sheets

MACHINE-LEARNING BASED DETECTION AND CLASSIFICATION OF PERSONALLY IDENTIFIABLE INFORMATION

TECHNICAL FIELD

The present invention relates generally to a method, system, and computer program product for detecting of personally identifiable information. More particularly, the present invention relates to a method, system, and computer program product for machine-learning based detection and classification of personally identifiable information.

BACKGROUND

Personally identifiable information (PII) is information that can be using on its own or with other information to identify, contact, or locate a single person, or to identify an individual in context. Corporations and agencies are often under an obligation to protect content containing PII to prevent exposure of the PII to unauthorized parties. Because of the significant reputational and financial consequences of failing to protect content containing PII, corporations and governmental agencies have made it a major goal to identify and protect such content. Privacy expectations arise from a number of laws in different jurisdictions such as the Health Insurance Portability and Accountability Act (HIPPA) and Payment Card Industry (PCI) data security standards. One of the most challenging aspects related to identifying and protecting PII is how to deal with "unstructured" content. Unstructured content refers to information that does not have a pre-defined data model or is not organized in a pre-defined manner. Examples of unstructured content may include, for example, documents or files on file shares, personal computing devices, and content management systems. These documents and files may be generated within or outside of an organization using many applications, can be converted to multiple file formats (e.g., Portable Document Format (PDF)), and seemingly have unlimited form and content. By contrast, structured data such as data stored in databases and support systems have often have defined fields in tables that have defined relationships with each other. For example, to protect social security numbers in a database, access to the field for social security numbers is controlled. With unstructured documents, the detection of PII is more challenging.

SUMMARY

The illustrative embodiments provide a method, system, and computer program product. An embodiment of a method for detection and classification of personally identifiable information includes identifying a document with a known author, and extracting a first set of features of the document using natural language processing. The embodiment further includes extracting a second set of features of the document based upon one or more past documents for the known author using a recurrent neural network, and classifying the first set of features and the second set of features using a classifier to produce classified extracted features. The embodiment further includes labelling personally identifiable information in the document based upon the classified extracted features.

In another embodiment, the document is an unstructured document. In another embodiment, the first set of features includes text-based features. In another embodiment, the natural language processing includes one or more of n-grams, word embedding, part of speech, and dictionary-based natural language processing procedures. In another embodiment, the second set of features includes user-specific features.

In another embodiment, the classifier includes a deep neural network classifier. In another embodiment, the classifier includes a maximum entropy classifier.

Another embodiment further includes training the classifier based upon the classified extracted features. Another embodiment further includes receiving feedback associated with the classified extracted features, and modifying the training of the classifier based upon the feedback. In another embodiment, the feedback is received from a subject matter expert. In another embodiment, extracting the second set of features is based upon a user-specific model.

In another embodiment, the user-specific model is trained based upon past results and user provided documents including labelled personally identifiable information.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments described herein are directed to machine-learning based detection and classification of personally identifiable information (PII). One or more embodiments recognize that traditional approaches to detecting PII rely on identifying patterns and rules (e.g., rule-based detection) to detect PII information. For example, most PII detection systems provide the ability to look for social security numbers using an expression such as "NNN-NN-NNNN" where N is a digit between 0 and 9. For such a procedure to work effectively, accurate text must be associated with the documents being searched. However, in many corporate collections a sizable proportion of documents does not have associated text. Moreover, other forms of PII, such as names, addresses, account numbers, etc. have different forms and spelling which are very challenging for render rule-based methods. Accordingly, one or more embodiments recognize that a need exists for detecting and classifying PII in unstructured documents.

One or more embodiments are directed to the use of two different machine-learning based approaches to detect and classify PII data in unstructured documents including text-based feature extraction using natural language processing (NLP) and user-specific feature extraction using a user-specific model based upon past documents from a known author. Examples of text-based feature extraction using natural language processing include part of speech, sentence parsing, n-grams, words within a window, dictionary features, etc. In one or more embodiments, the natural language processing features are extracted from an annotated training corpus.

In one or more embodiments, the extracted features are used to train a classifier for classifying the extracted features. In particular embodiments, the classifier includes one or more of a deep neural network (DNN) to classify input sentences or a maximum entropy framework to provide a probabilistic approach to classification.

Accordingly, one or more embodiments provide for use of NLP techniques to extract PII-specific text-based features from unstructured documents, and use of the NLP features as inputs to a classifier such as one or more of a deep neural network classifier which provides unsupervised feature extraction and a maximum entropy framework. In one or more embodiments, the extracted features are used in a user-specific PII Recurrent Neural Network (RNN) model that encodes what constitutes PII based upon a user's history of authored unstructured documents.

In one or more embodiments, the personally identifiable information (PII) within the unstructured document is labeled based upon the classified extracted features. In one or more embodiments, the user-specific model is trained based upon past results and user provided documents with labelled personally identifiable information.

An embodiment can be implemented as a software application. The application implementing an embodiment can be configured as a modification of an existing system or platform, as a separate application that operates in conjunction with an existing system or platform, a standalone application, or some combination thereof.

The illustrative embodiments are described with respect to certain types of tools and platforms, procedures and algorithms, services, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
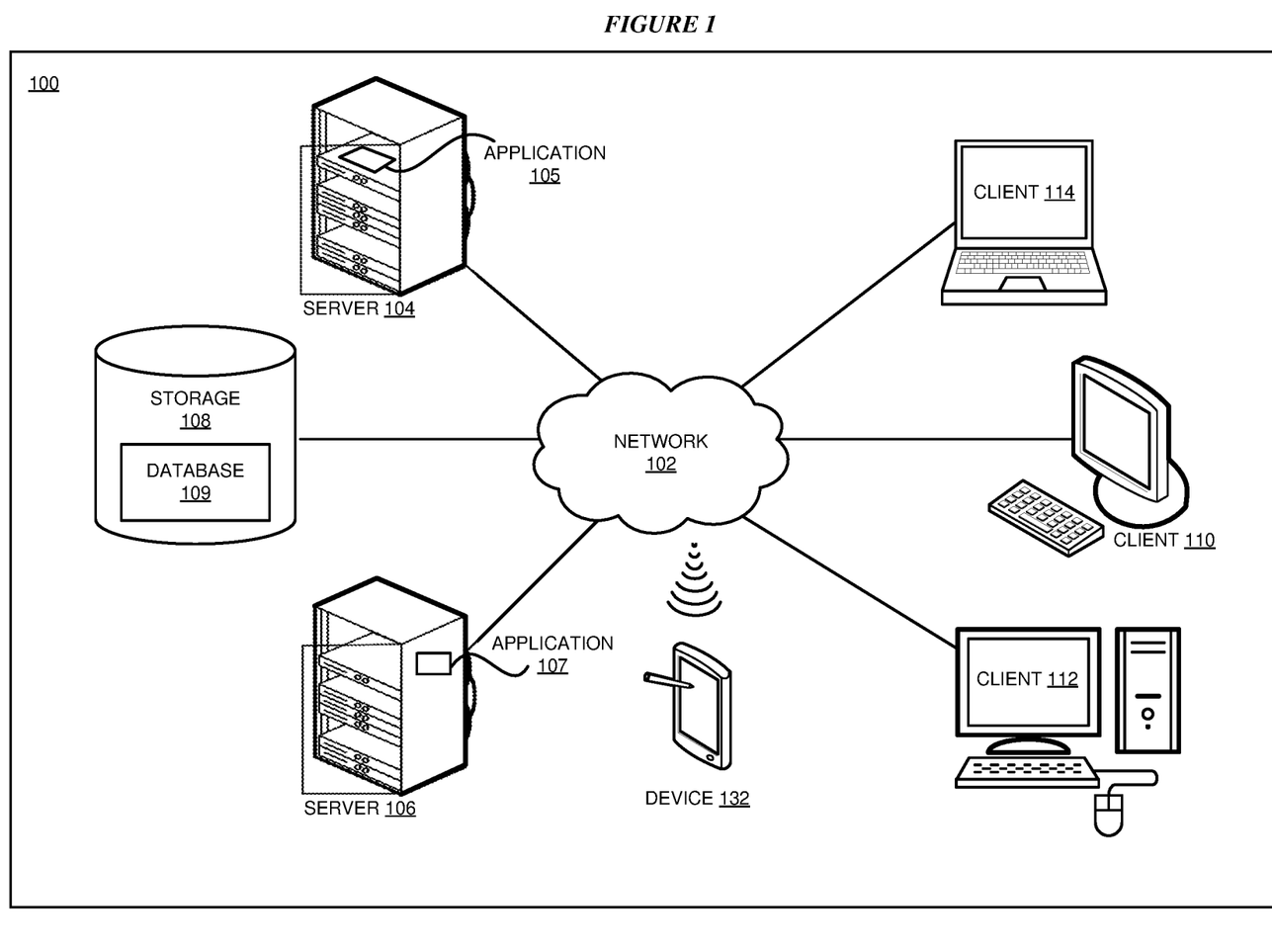
FIG. 1 depicts a block diagram of a network of data processing systems in which illustrative embodiments may be implemented.
Figure 2:
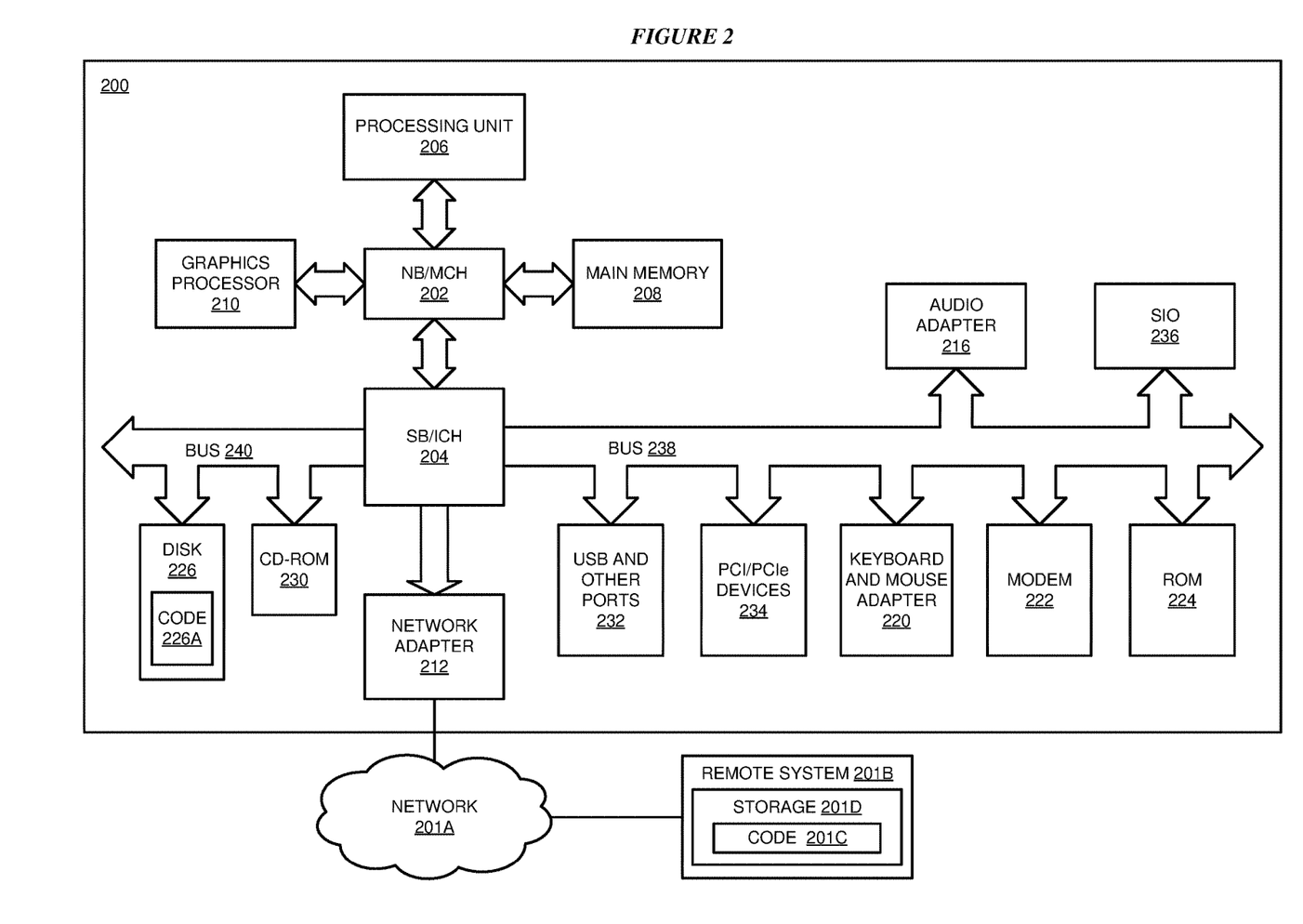
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown. Server 104 includes an application 105 that may be configured to implement one or more of the functions described herein for machine-learning based detection and classification of personally identifiable information in accordance with one or more embodiments.

Server 106 implements an application 107 configured to allow users to provide unstructured documents with PII labels as described herein with respect to various embodiments. Storage device 108 includes one or more databases 109 configured to store unstructured documents with PII labels received from users of application 107 as well as other training data as described herein. In other embodiments, the functions of server 106 and/or application 107 may instead be performed by server 104 and/or application 105, respectively.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
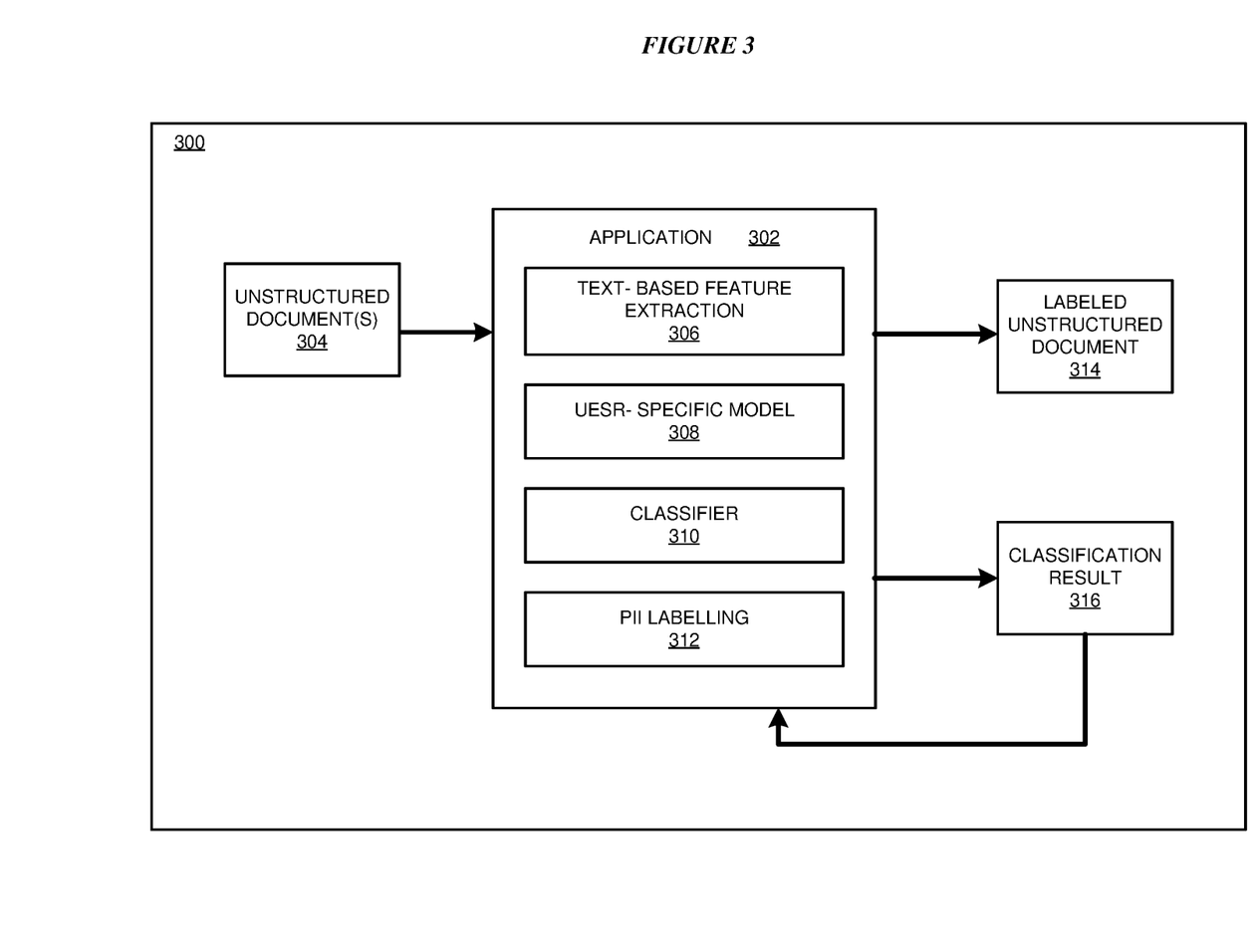
FIG. 3 depicts a block diagram of an example configuration for machine-learning based detection and classification of personally identifiable information in accordance with an illustrative embodiment.

With reference to FIG. 3, this figure depicts a block diagram of an example configuration 300 for machine-learning based detection and classification of personally identifiable information in accordance with an illustrative embodiment. The example embodiment includes an application 302. In a particular embodiment, application 302 is an example of application 105 of FIG. 1.

Applicant 302 receives one or more unstructured documents 304. Application 302 includes a text-based feature extraction component 306, a user-specific model component 308, a classifier component 310, and a PII labelling component 312. Text-based feature extraction component 306 is configured to extract text-based features from unstructured document(s) 304 using natural language processing (NLP). User-specific model component 308 is configured to extract user-specific features from unstructured document(s) 304 based upon past documents from a known author. In a particular embodiment, user-specific model component 308 includes a recurrent neural network (RNN) for extracting the user-specific features.

Classifier component 310 is configured to receive the text-based features from text-based feature extraction component 306 and the user-specific features from user-specific model component 308 to classify the extracted features as either PII data (PII) or non-PII data. In particular embodiments, classifier component 310 includes one or more of a DNN or a maximum entropy framework to classify the extracted features as either PII data or non-PII data.

PII labelling component 312 is configured to label the PII elements within unstructured document(s) 304 based upon the classified extracted features. Application 302 is configured to output a labelled unstructured document 314 in which PII information in unstructured document(s) 304 that is detected and classified by application 302 is labelled as PII. Application 302 is further configured to output classification result 316 indicative of the results of classification of the PII data by classifier component 310. In one or more embodiments, application 302 is configured to further train classifier component 310 based upon classification result 316.

Figure 4:
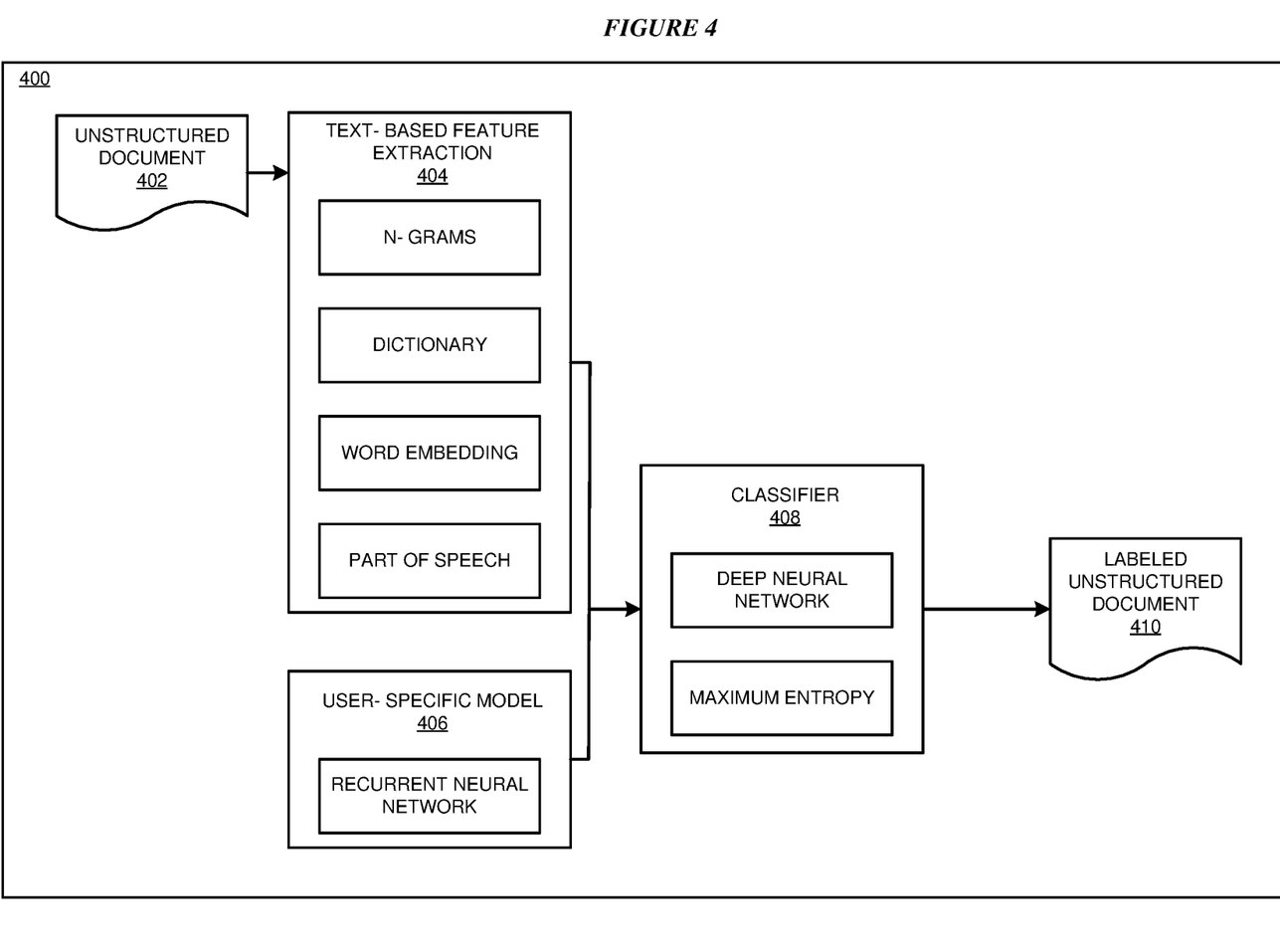
FIG. 4 depicts a block diagram of an example training architecture for machine-learning based detection and classification in accordance with an illustrative embodiment.

With reference to FIG. 4, this figure depicts a block diagram of an example training architecture 400 for machine-learning based detection and classification of personally identifiable information in accordance with an illustrative embodiment. In one or more embodiments, training architecture 400 is implemented by application 105 of FIG. 1.

In an embodiment, text-based feature extraction component 404 receives an unstructured document 402 potentially containing PII in which the author of unstructured document 402 is presumed to be known. Text-based feature extraction component 404 extracts natural language processing (NLP) features from unstructured document 402 using an array of text-based feature extractors. In the embodiment illustrated in FIG. 4, the text-based feature extractors include an n-gram feature extractor, a dictionary-based feature extractor, a word embedding feature extractor, and a part of speech (e.g., verb, noun, adjective, etc.). It should be understood that the particular text-based classification techniques illustrated in FIG. 4 are not an exhaustive list. In other embodiments, other text-based classification techniques may be used. In an embodiment, text-based feature extraction component 404 represents the extracted features as vectors, joins the feature vectors from each text-based feature extractor into a single feature vector, and provides the single feature vector as an input to a classifier component 408.

In parallel, a user-specific model 406 including a recurrent neural network (RNN) that has been trained on features corresponding to only documents for the given author is provided with the current feature vector and outputs a set of features to classifier component 408. The RNN features encapsulate knowledge about the word and phrase usage patterns for the particular user over time and differentiates the embodiment of FIG. 4 from traditional systems that examine a single document in isolation. In the embodiment, text-based feature extraction component 404 provides the current document features to classifier component 408 and user-specific model component 406 provides the user-specific features to classifier component 408. Classifier component 408 detects, classifies, and labels the PII elements in the current text of unstructured document 402 using one or more classifiers to produce labeled unstructured document 410. In particular embodiments, the one or more classifiers include one or more of a deep neural network classifier or a maximum entropy classifier as further described herein.

Figure 5:
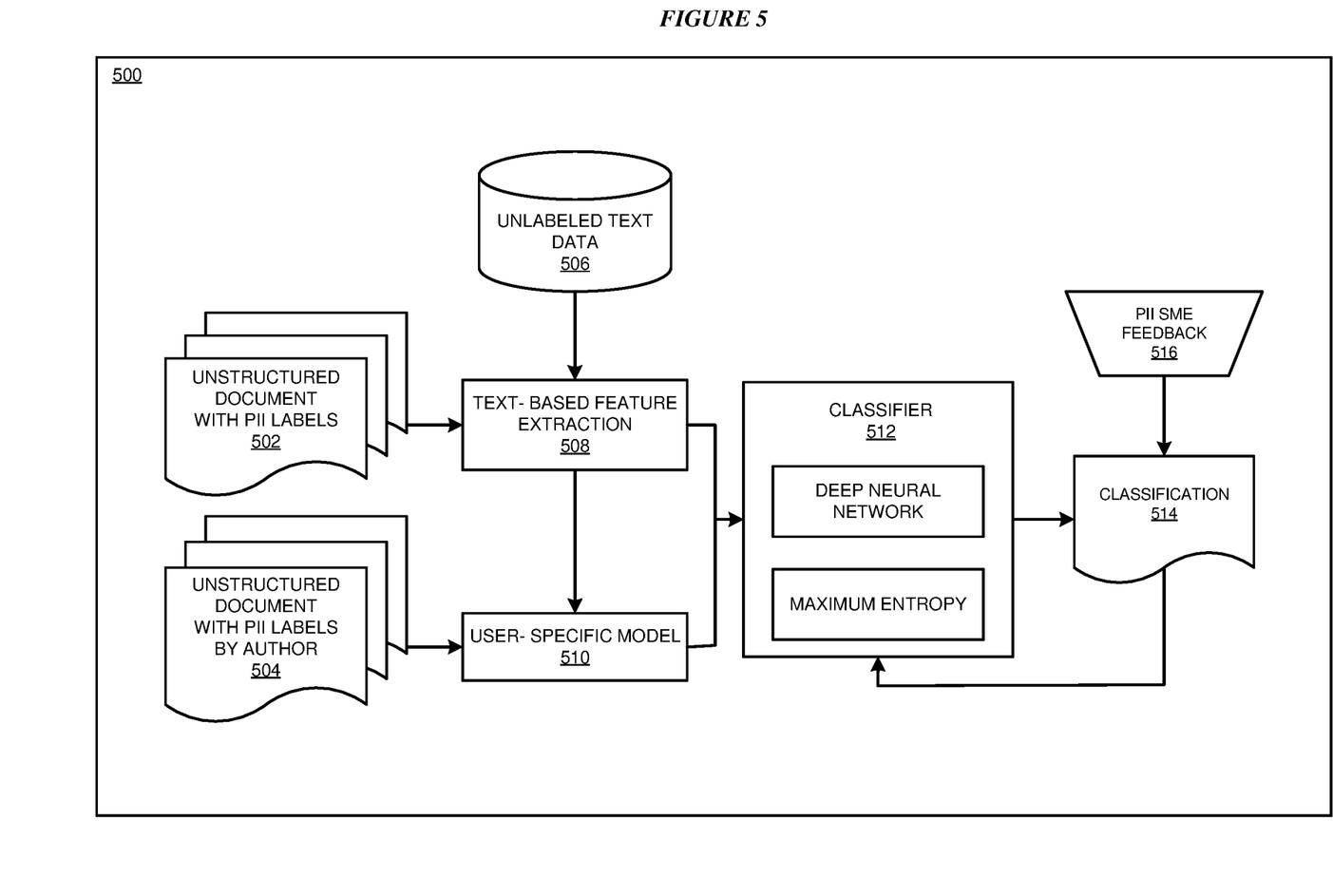
FIG. 5 depicts a block diagram of an example user-specific training architecture for machine-learning based detection and classification in accordance with an illustrative embodiment.

With reference to FIG. 5, this figure depicts a block diagram of an example user-specific training architecture 500 for machine-learning based detection and classification of personally identifiable information in accordance with an illustrative embodiment. In one or more embodiments, training architecture 500 is implemented by application 105 of FIG. 1.

In the embodiment of FIG. 5, models are training using a number of different data sources. In the embodiment, a main source of domain-specific data is a set of unstructured documents including PII labels 502 is received by text-based feature extraction component 508. In addition, a historical set of unstructured documents with PII labels by a particular author is received by a user-specific model component 510 to develop patterns of word and/or phrase usage for a particular user. In the embodiment, sets of unlabeled unstructured text data 506 is also received by text-based feature extraction component 508 to provide the models with an understanding of a large number of different word and/or phrase characteristics including, but not limited to, word contexts, parts of speech, and grammar.

Text-based feature extraction component 508 extracts natural language processing (NLP) features from unstructured documents with PII labels 502 using an array of text-based feature extractors based upon the unlabeled unstructured text data 506. In the embodiment illustrated in FIG. 5, the text-based feature extractors include an n-gram feature extractor, a dictionary-based feature extractor, a word embedding feature extractor, and a part of speech (e.g., verb, noun, adjective, etc.). It should be understood that the particular text-based classification techniques illustrated in FIG. 5 are not an exhaustive list. In other embodiments, other text-based classification techniques may be used. In an embodiment, text-based feature extraction component 508 represents the extracted features as vectors, joins the feature vectors from each text-based feature extractor into a single feature vector, and provides the single feature vector as an input to a classifier component 508.

In parallel, user-specific model 510 including a recurrent neural network (RNN) that has been trained on features corresponding to unstructured documents with PII labels 504 for the given author outputs a set of user-specific features to classifier component 512. The RNN features encapsulate knowledge about the word and phrase usage patterns for the particular user over time.

Classifier component 512 detects and classifies the extracted features to produce a classification output 514. In particular embodiments, the one or more classifiers include one or more of a deep neural network classifier or a maximum entropy classifier as further described herein. In the embodiment, the classification output 514 is used to retrain classifier component 512. In a particular embodiment, application 105 calculates an error value based upon the classification results and adjusts a model of classifier component 512 based upon the error.

In an embodiment, application 105 receives feedback associated with the classified extracted features indicated by classification output 514 from a PII subject matter expert (SME) and modifies the training of the classifier component 512 based upon the feedback. Accordingly, one or more embodiments provides for a framework that allows for a semi-supervised feedback loop in order to retrain the classifier. The framework allows for input from a PII subject matter expert, incorporating expert knowledge through the correcting of classification errors.

Figure 6:
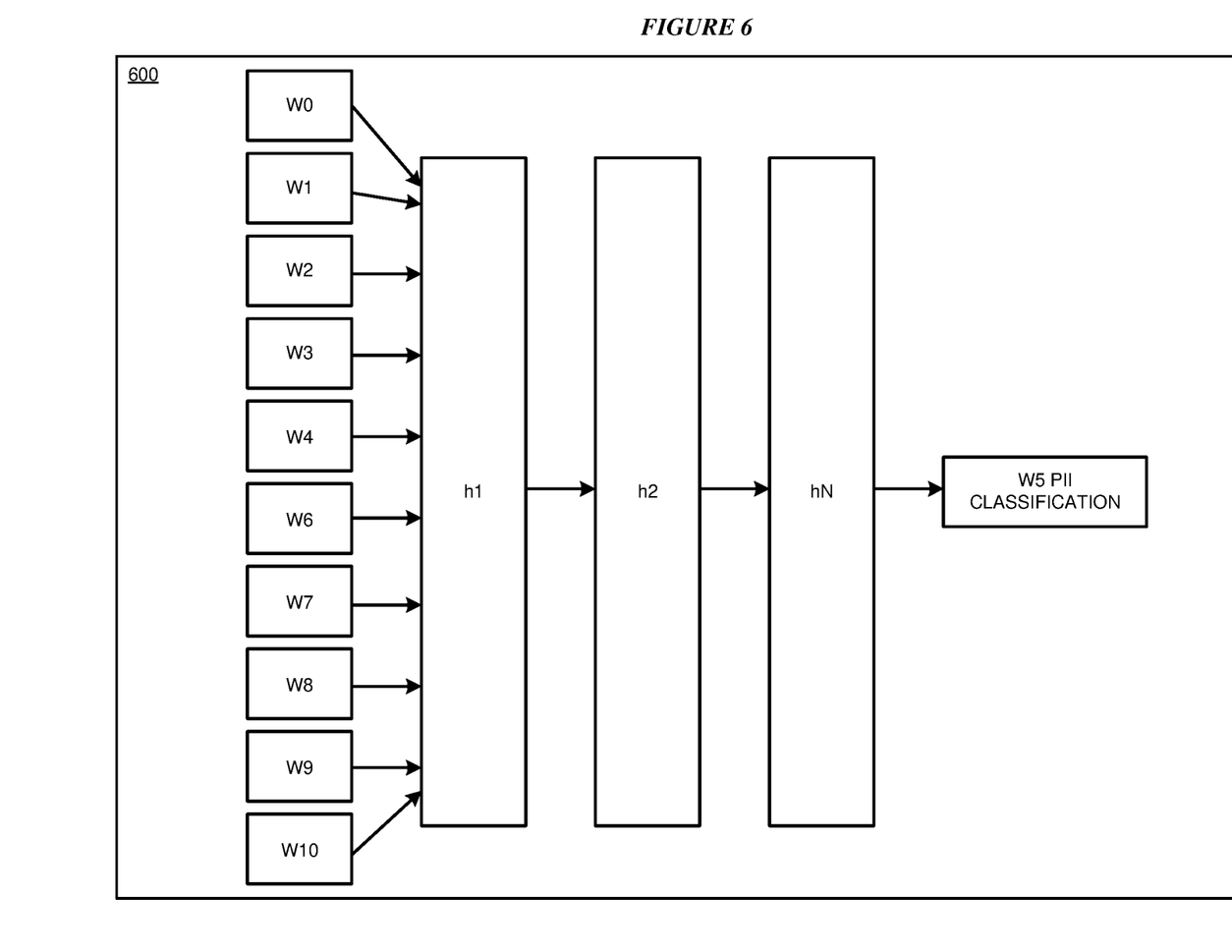
FIG. 6 depicts a block diagram of an example deep neural network (DNN) classifier in accordance with an illustrative embodiment.

With reference to FIG. 6, this figure depicts a block diagram of an example deep neural network (DNN) classifier 600 for machine-learning based detection and classification of personally identifiable information in accordance with an illustrative embodiment. In the embodiment of FIG. 6, the DNN classifier may be used as a classifier in one or more of the embodiments as previously described with respect to FIGS. 3-5. In the embodiment of FIG. 6, a DNN is used to receive the text-based feature vectors and user-specific feature vectors and determine a classification of either PII or non-PII for each element, such as a word and/or phrase, of an unstructured document. The embodiment of FIG. 6 uses a concept of distributed semantic models, whereby a word embedding is learned for each word in a corpus based on other words around it. Typical approaches to vector space models focus on either count-based models or predictive models. Count-based models compute counts of word co-occurrence and use these counts to form the basis for a dense vector representation. Predictive models directly try to predict a word from its neighbors from a parameterized vector that is tuned as a variable in the model.

In the embodiment of FIG. 6, a vector space model (VSM) is generated as the last fully connected feature layer of a DNN and is trained to classify a word in a center of a window of words as either PII data or non-PII data. The text-based and user-specific features extracted on a per-word are used to represent each word as input for classification. In the embodiment of FIG. 6, a DNN classifier is illustrated depicting a plurality of DNN layers h1 to hN in which layer h1 to receives a plurality of feature vector inputs w0-w4 and w6-w10. In the embodiment, layers h1 to hN-2) are modeled as non-fully connected layers or restricted Boltzmann machines. A restricted Boltzmann machine is a generative stochastic artificial neural network than can learn a probability distribution over a set of inputs.

Layers h1 to hN-2 contain the essence of a final set of features needed to represent the given text. The features are determined by the DNN itself during training instead of being "handcrafted" features created by a machine learning expert. The last layers (hN-1 to hN) function as final classification layers that use the previous features to determine the final PII classification (w5).

As discussed above, one or more embodiments use a maximum entropy classifier to classify elements of an unstructured document as containing either PII data or non-PII data. Maximum entropy probability models offer a way to combine diverse pieces of contextual evidence in order to estimate a probability of a certain class occurring. Maximum entropy approaches have been very successful in entity detection and recognition tasks. The maximum entropy approach is based on an exponential model that is used to predict the probabilities of different possible outcomes of a categorically distributed dependent variable given a set of independent variables. The exponential model may be expressed as:

$$p(c|x) = 1/Z(x) * \exp(\Sigma_i \lambda_i f_i(x,c)) \qquad \text{(Equation 1)}$$

Z(x) is for normalization and may be expressed as:

$$Z(x) = \Sigma_{c'} \exp(\Sigma_i \lambda_i f_i(x,c')) \qquad \text{(Equation 2)}$$

where c is the class, x is a context information and (x,c) is the i-th feature vector. The goal of the maximum entropy is, for a given feature vector x, find the class c that maximizes the probability p(c|x) shown in Equation 1. In one or more embodiments, the feature vector x for a word is composed of a number of items extracted from the word and from other words around the word. Once computed, a feature vector x is input into Equation 1 to find the class that maximizes the a posteriori probability p(c|x).

Maximum Entropy is a convenient approach for classification tasks due to the feature-based model of the embodiments described herein. In one or more embodiments, a fully binary feature vector set that may be used in the maximum entropy classifier may include one or more of the following:
  (i) Wi: A concerned word and its class;
  (ii) {Wi−2, Wi−1} and {Wi+1, Wi+2}: The bigrams coming before and after a word, which represent a context in which the word appears;
  (iii) Wi exists in a list of potential PII words;
  (iv) a part of speech (POS);
  (v) an initial letter is capital letter; and
  (vi) flags (e.g., 4 digits, 2 digits, a potential date, etc.)

Figure 7:
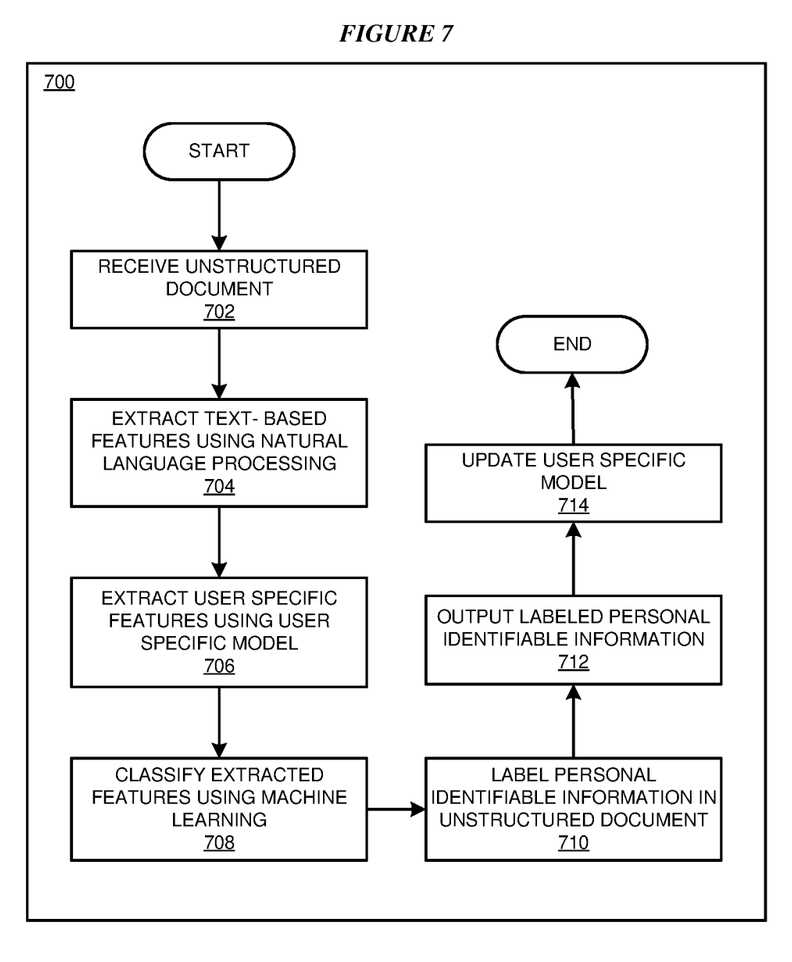
FIG. 7 depicts a flowchart of an example process for machine-learning based detection and classification of personally identifiable information in accordance with an illustrative embodiment.

With reference to FIG. 7, this figure depicts a flowchart of an example process 700 for machine-learning based detection and classification of personally identifiable information in accordance with an illustrative embodiment. In block 702, application 105 receives an unstructured document for a known author. In block 704, application 105 extracts text-based features as a first set of feature using natural language processing. In block 706, application 105 extracts user-specific features of unstructured document as a second set of features based upon one or more past documents for the known author using a recurrent neural network.

In block 708, application 105 classifies the first set of features and the second set of features using a machine learning classifier to produce classified extracted features. In an, the classifier includes one or more of a DNN classifier and a maximum entropy classifier. In block 710, application 105 labels personally identifiable information in the unstructured document based upon the classified extracted features. In block 712, application 105 outputs the labelled personally identifiable information.

In block 714, application 105 updates the user specific model based upon the classified extracted features. In other embodiments, application 105 updates a classifier model based upon the classified extracted features. Process 700 then ends.

Thus, a computer implemented method, system or apparatus, and computer program product are provided in the illustrative embodiments for machine-learning based detection and classification of personally identifiable information and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for detection and classification of personally identifiable information, the method comprising:
    identifying a document with a known author;
    extracting a first set of features of the document using natural language processing;
    extracting a second set of features of the document based upon one or more past documents for the known author using a recurrent neural network;
    classifying the first set of features and the second set of features using a classifier to produce classified extracted features, wherein the classifier employs a maximum entropy model to estimate a probability of a certain class occurring, and wherein the maximum entropy model uses a number of items extracted from a first word and from other words within a window of the first word; and
    labelling personally identifiable information in the document based upon the classified extracted features.

2. The method of claim 1, wherein the document is an unstructured document.

3. The method of claim 1, wherein the first set of features includes text-based features.

4. The method of claim 1, wherein the natural language processing includes one or more of n-grams, word embedding, part of speech, and dictionary-based natural language processing procedures.

5. The method of claim 1, wherein the second set of features includes user-specific features.

6. The method of claim 1, wherein the classifier includes a deep neural network classifier.

7. The method of claim 1, further comprising training the classifier based upon the classified extracted features.

8. The method of claim 7, further comprising:
receiving feedback associated with the classified extracted features; and
modifying the training of the classifier based upon the feedback.

9. The method of claim 8, wherein the feedback is received from a user.

10. The method of claim 1, wherein extracting the second set of features is based upon a user-specific model.

11. The method of claim 10, wherein the user-specific model is trained based upon past results and user provided documents including labelled personally identifiable information.

12. A computer usable program product comprising one or more computer-readable storage devices, and program instructions stored on at least one of the one or more storage devices, the stored program instructions comprising:
program instructions to identify a document with a known author;
program instructions to extract a first set of features of the document using natural language processing;
program instructions to extract a second set of features of the document based upon one or more past documents for the known author using a recurrent neural network;
program instructions to classify the first set of features and the second set of features using a classifier to produce classified extracted features, wherein the classifier employs a maximum entropy model to estimate a probability of a certain class occurring, and wherein the maximum entropy model uses a number of items extracted from a first word and from other words within a window of the first word; and
program instructions to label personally identifiable information in the document based upon the classified extracted features.

13. The computer usable program product of claim 12, wherein the document is an unstructured document.

14. The computer usable program product of claim 12, wherein the first set of features includes text-based features.

15. The computer usable program product of claim 12, wherein the natural language processing includes one or more of n-grams, word embedding, part of speech, and dictionary-based natural language processing procedures.

16. The computer usable program product of claim 12, wherein the second set of features includes user-specific features.

17. The computer usable program product of claim 12, wherein the stored program instructions are stored in a computer readable storage device in a data processing system, and wherein the stored program instructions are transferred over a network from a remote data processing system.

18. The computer usable program product of claim 12, wherein the stored program instructions are stored in a computer readable storage device in a server data processing system, and wherein the stored program instructions are downloaded over a network to a remote data processing system for use in a computer readable storage device associated with the remote data processing system.

19. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to identify a document with a known author;
program instructions to extract a first set of features of the document using natural language processing;
program instructions to extract a second set of features of the document based upon one or more past documents for the known author using a recurrent neural network;
program instructions to classify the first set of features and the second set of features using a classifier to produce classified extracted features, wherein the classifier employs a maximum entropy model to estimate a probability of a certain class occurring, and wherein the maximum entropy model uses a number of items extracted from a first word and from other words within a window of the first word; and
program instructions to label personally identifiable information in the document based upon the classified extracted features.

\* \* \* \* \*